United States Patent
Yoshida et al.

[11] Patent Number: 6,129,172
[45] Date of Patent: Oct. 10, 2000

[54] ELECTRIC POWER STEERING APPARATUS

[75] Inventors: Kazuyuki Yoshida, Sakurai; Mitsuhiko Nishimoto, Kashihara, both of Japan

[73] Assignee: Koyo Seiko Co., Ltd., Osaka, Japan

[21] Appl. No.: 09/116,086

[22] Filed: Jul. 15, 1998

[30] Foreign Application Priority Data

Jul. 23, 1997 [JP] Japan ................................ 9-197605

[51] Int. Cl.⁷ ................................................ B62D 5/99
[52] U.S. Cl. ........................... 180/446; 180/443; 701/41
[58] Field of Search ................................ 180/443, 446; 364/424.051; 701/41

[56] References Cited

U.S. PATENT DOCUMENTS

| | | | |
|---|---|---|---|
| 4,834,203 | 5/1989 | Takahashi et al. | 180/443 |
| 5,040,629 | 8/1991 | Matsuoka et al. | 180/446 |
| 5,481,457 | 1/1996 | Yamamoto et al. | 364/424.05 |
| 5,482,129 | 1/1996 | Shimizu | 180/446 |
| 5,528,497 | 6/1996 | Yamamoto et al. | 364/424.05 |
| 5,600,559 | 2/1997 | Nishimoto et al. | 364/424.051 |
| 5,720,361 | 2/1998 | Nishimoto et al. | 180/446 |
| 5,740,040 | 4/1998 | Kikufu et al. | 364/424.051 |
| 5,742,919 | 4/1998 | Ashrafi et al. | 701/70 |
| 5,752,209 | 5/1998 | Nishimoto et al. | 701/41 |
| 5,774,819 | 6/1998 | Yamamoto et al. | 701/41 |
| 5,787,376 | 7/1998 | Nishino et al. | 701/41 |
| 5,845,222 | 12/1998 | Yamamoto et al. | 701/41 |
| 5,881,836 | 3/1999 | Nishimoto et al. | 180/446 |
| 5,917,430 | 7/1999 | Mukai et al. | 180/446 |

FOREIGN PATENT DOCUMENTS 9-277950  10/1997  Japan .

*Primary Examiner*—J. J. Swann
*Assistant Examiner*—L. Lum
*Attorney, Agent, or Firm*—Darby & Darby

[57] ABSTRACT

An electric power steering apparatus is disclosed in which steering return control is maintained when vehicle speed reaches a predetermined vehicle speed range after the vehicle speed has been lower than the speed range, and steering return control is disabled when the vehicle speed reaches the predetermined vehicle speed range after the vehicle speed has been higher than the speed range and steering angular velocity has been higher than a predetermined value. Therefore, the control state between the steering return control and convergence control can preferably be switched so that the steering wheel settles quickly to a steering angle predetermined point based on the vehicle speed and the steering angular velocity even while the steering state is not changing.

4 Claims, 15 Drawing Sheets

ELECTRIC POWER STEERING APPARATUS

BACKGROUND OF THE INVENTION

The present invention relates to an improvement in an electric power steering apparatus which performs a steering force assistance in a manner of setting a motor current target value of a steering force assisting motor determined on the basis of a detected value of a steering torque as a target value of automatic control, and driving the motor according to a PWM control.

There is an electric power steering apparatus which drives a steering force assisting motor according to a PWM control on the basis of a motor current target value of the auxiliary motor determined based on a detected value of a steering torque, and a detected value of a driving current of the motor. In the electric power steering apparatus, when restoring a steering wheel, a restoration current of the steering wheel is supplied to the motor so as to perform a restoration control of the steering wheel. And then, the restoration current is set to "0 (zero)" when restoring the steering wheel to the vicinity of its neutral position (the middle point of steering angle) where a vehicle goes straight.

However, even if the steering wheel is restored to the neutral position, the rotation of the steering wheel does not immediately stop at the neutral position due to an inertial force of the motor. As shown in FIG. 1, the steering wheel repeats an operation like a pendulum such that it is over the opposite side of the neutral position (0°) and returns, and thereafter, converges at the neutral position. For this reason, it takes time until the steering wheel converges at the neutral position and stops, during this, a running state of the vehicle is unstable, in particular, a great influence is given to the vehicle when the vehicle is running at a high speed.

Moreover, even if the vehicle speed is the same, depending upon a steering state, there is the case where the restoration control is required, or the case where a convergence control of the steering wheel is required. For example, in the case where the rotation of the steering wheel is fast in the vicinity of the neutral position during medium vehicle speed, the convergence control is required. Also, in the case where the rotation of the steering wheel is slow in the vicinity of the neutral position during medium vehicle speed, it is the best to carry out the restoration control.

In order to solve the aforesaid problem, the present applicant has proposed an electric power steering apparatus disclosed in Japanese Patent Application No. 8-91341 (1996), together with other applicant.

In the electric power steering apparatus, a relationship between a vehicle speed, a steering angular velocity, restoration control and convergence control, is determined as shown in FIG. 2 which is a graph having an abscissa taking a vehicle speed, an ordinate taking an steering angular velocity. More specifically, the restoration control is possible when the vehicle speed is within the range of 0–30 km/h and when the vehicle speed is within the range of 30–80 km/h and the steering angular velocity is lower than 55°/s.

Also, the convergence control is possible when the vehicle speed is higher than 30 km/h and the steering angular velocity is higher than 60°/s.

In a region where the vehicle speed is within the range of 30–80 km/h and the steering angular velocity is within the range of 55°–60°/s, the steering angular velocity has a hysteresis when carrying out a change-over of the restoration control and the convergence control. When the previous control is the restoration control, the restoration control is carried out, and when the previous control is the convergence control or usual steering assisting control (assist control), the assist control is carried out.

In the aforesaid electric power steering apparatus, however, in FIG. 2, for example, in the case where the steering angular velocity is in a state of being higher than 60°/s and the vehicle speed oscillates around 30 km/h, the restoration control and the convergence control are alternately changed over in short time, there has arisen a problem that hunting occurs with the steering wheel.

BRIEF SUMMARY OF THE INVENTION

The present invention has been made to solve the aforesaid problem in the prior art. An object of the present invention is to provide an electric power steering apparatus which can perform either preferable control of restoration control or convergence control on the basis of a vehicle speed and a steering angular velocity even in the same steering state, obtain preferable steering feeling, and quickly restore a steering wheel to its neutral position.

A motor current target value of the steering force assisting motor is determined on the basis of the detected value of the steering torque applied to the steering wheel, and the motor is driven in its rotation according to the PWM control so that the motor current becomes the target value. Further, when the steering torque detected value is within a predetermined range, a vehicle speed detected by a vehicle speed sensor is higher than a first vehicle speed and a steering angular velocity detected by a steering angular velocity detection means is higher than a first steering angular velocity, control of braking the motor is carried out. When the vehicle speed is lower than the first vehicle speed, and the vehicle speed exists between the first vehicle speed and the second vehicle speed and the steering angular velocity is lower than the first steering angular velocity, control of driving the motor and restoring the steering wheel to a predetermined steering angle, preferably the steering angle middle point between the two extremes of the steering angle is carried out.

In the electric power steering apparatus having the aforesaid function, the electric power steering apparatus of the present invention includes: means for continuously maintaining a state of carrying out control of restoring the steering wheel to the steering angle middle point when the vehicle speed is lower than a third vehicle speed which is lower than the first vehicle speed and becomes between the third vehicle speed and the first vehicle speed from a state of carrying out the control; and means for continuously maintaining a state of not carrying out the control when the vehicle speed is higher than the first vehicle speed, the steering angular velocity is higher than the first steering angular velocity, and the vehicle speed becomes between the first vehicle speed and the third vehicle speed from a state of not carrying out the control.

Therefore, it is possible to give hysteresis to the vehicle speed when making a change-over of the state of carrying out the restoration control and the state of carrying out the control of braking the motor, and to prevent hunting from occurring due to the restoration control of and the braking control. Therefore, preferable steering feeling can be obtained.

Further, another electric power steering apparatus of the present invention includes: means for continuously maintaining a state of carrying out control of returning the steering wheel to the steering angle neutral position when the steering angular velocity is lower than a second steering angular velocity which is lower than the first steering angular velocity and becomes between the second angular velocity and the first steering angular velocity from a state of carrying out the control; and means for continuously maintaining a state of not carrying out the control when the steering angular velocity is higher than the first steering angular velocity, and when the steering angular velocity becomes between the first steering angular velocity and the second steering angular velocity from a state of not carrying out the control.

Therefore, it is possible to give hysteresis to the steering angular velocity when making a change-over of the state of carrying out the restoration control and the state of carrying out the control of braking the motor, and to prevent hunting from occurring due to the restoration control of and the braking control. Therefore, preferable steering feeling can be obtained.

The above and further objects and features of the invention will more fully be apparent from the following detailed description with accompanying drawings.

BRIEF DESCRIPTION OF THE SEVERAL VIEWS OF THE DRAWINGS

FIG. 11, which comprises FIG. 11A is to explain the hysteresis of a steering angular velocity while a vehicle speed is within the range of 30–80 km/h, FIG. 11B is to explain the hysteresis of a steering angular velocity while a vehicle speed is within the range of 20–30 km/hm, FIG. 11C is to explain the hysteresis of a vehicle speed while a steering angular velocity is higher than 60°/s;

DETAILED DESCRIPTION OF THE INVENTION

An embodiment of the present invention will be described below in detail with reference to the accompanying drawings.

Figure 1:
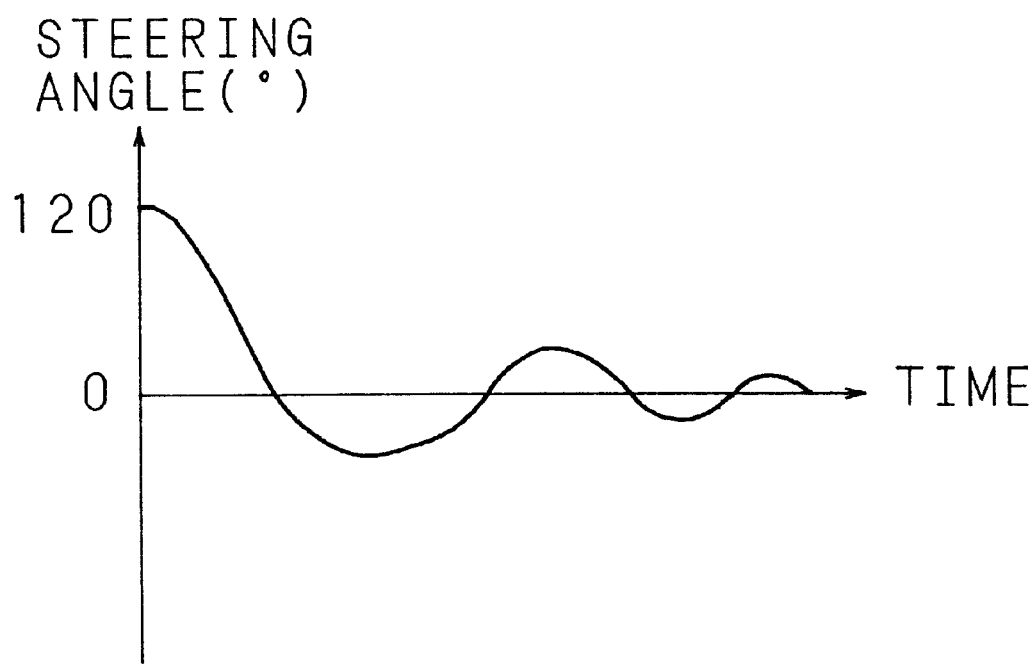
FIG. 1 is a view to explain convergence to a neutral position of a steering wheel according to a conventional electric power steering apparatus.
Figure 2:
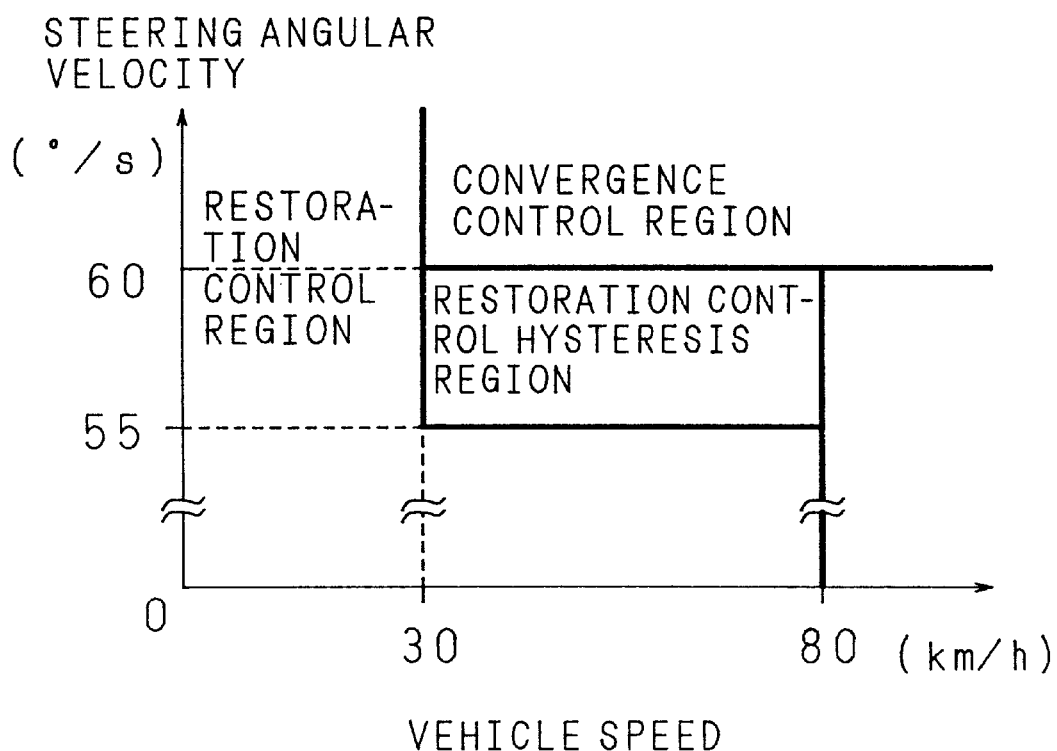
FIG. 2 is a chart to explain a relationship between a vehicle speed, a steering angular velocity, restoration control and convergence control of an electric power steering apparatus according to the prior application.
Figure 3:
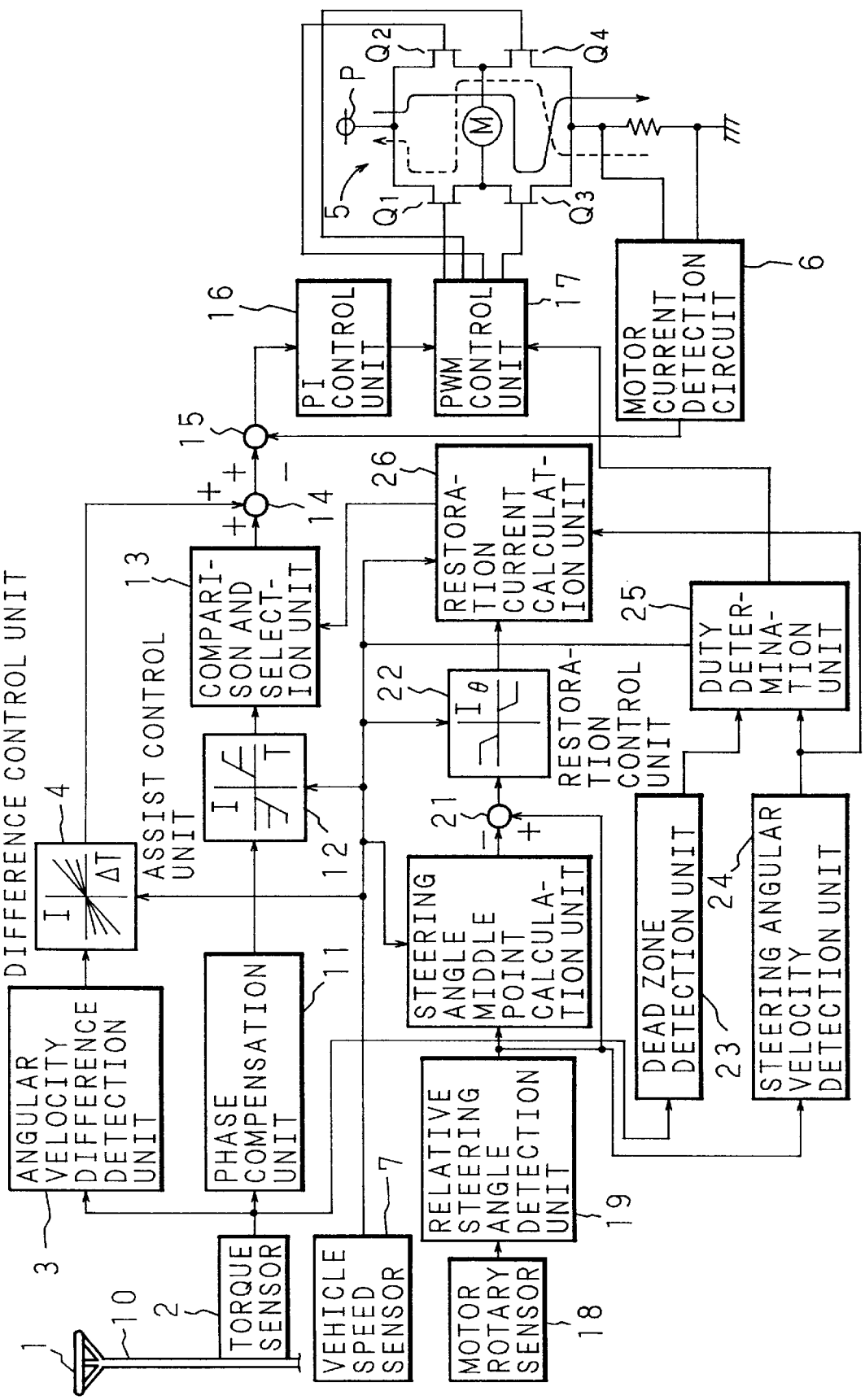
FIG. 3 is a block diagram showing a principal configuration of an electric power steering apparatus according to an embodiment of the present invention.

FIG. 3 is a block diagram showing a principal configuration of an electric power steering apparatus according to an embodiment of the present invention. In the electric power steering apparatus, a steering torque signal from a torque sensor 2 provided on a steering shaft 10 is compensated in a phase by means of a phase compensation unit 11, and then, is supplied to an assist control unit 12.

Further, a vehicle speed signal from a vehicle speed sensor 7 is supplied to the assist control unit 12, an angular velocity difference control unit 4, a restoration control unit 22, a steering angle middle point calculation unit 20, a duty determination unit 25 and a restoration current calculation unit 26. The assist control unit 12 outputs a target current value for assist control (steering assisting control) on the basis of a steering torque signal from the phase compensation unit 11 and the vehicle speed signal from the vehicle speed sensor 7, and then, supplies the target value to a comparison and selection unit 13. On the other hand, the steering torque signal from the torque sensor 2 is differentiated by means of an angular velocity difference detection unit 3, and then, the differentiated value is supplied to an angular velocity difference control unit 4. The angular velocity difference control unit 4 outputs a current value in response to the given differentiated value of the steering torque signal and the vehicle speed signal from the vehicle speed sensor 7, and then, supplies it to an adding unit 14. The current value is used for inertial compensation of a steering force auxiliary motor M.

When a motor rotational speed signal from a motor rotary sensor 18 for detecting a rotational speed of the motor M is supplied to a relative steering angle detection unit 19, the relative steering angle detection unit 19 detects a relative steering angle of a steering wheel 1 on the basis of the motor rotational speed signal, and then, supplies it to the steering angle middle point calculation unit 20, a subtracting unit 21 and a steering angular velocity detection unit 24.

The steering angle middle point calculation unit 20 calculates a steering angle middle point of the steering wheel 1 in which a vehicle goes straight from the given relative steering angle, and then, supplies the calculated result to the subtracting unit 21. The subtracting unit 21 subtracts the given calculated result from a relative steering angle to obtain an absolute steering angle which is a steering angle from the steering angle middle point, and then, supplies the signal to a restoration control unit 22.

This embodiment has shown an example of detecting the relative steering angle on the basis of a rotational speed of the motor M connected to a steering mechanism. In place of the rotational speed of the motor M, for example, the relative steering angle may be detected in a manner of detecting a rotational speed of a steering shaft 10 connected to the steering wheel 1 with the use of a rotary encoder. Further, in place of the method of detecting the absolute steering angle with the use of a relative steering angle detected value, the absolute steering angle may be directly detected.

The restoration control unit 22 outputs a target current value of the motor M for restoring the steering wheel 1 on the basis of the absolute steering angle and the vehicle speed signal from the vehicle speed sensor 7, and then, supplies it to the restoration current calculation unit 26.

The restoration current calculation unit 26 multiplies the target current value obtained from the restoration control unit 22 by a vehicle speed coefficient in accordance with the vehicle speed to calculate a target current value of the restoration current, and then, supplies it to the comparison and selection unit 13.

The comparison and selection unit 13 makes a comparison in the absolute value between the target current value from the assist control unit 12 and the target current value from the restoration current calculation unit 26, and then, supplies a target current value having a larger absolute value to the adding unit 14.

The adding unit 14 adds a current value obtained from the angular velocity difference control unit 4 to the given target current value, and then, supplies the added result to the subtracting unit 15.

The subtracting unit 15 calculates a deviation between the added result from the adding unit 14 and a feedback value of a driving current of the motor M detected by a motor current detection unit 6, and then, supplies the deviation to a PI control unit 16. The PI control unit 16 adds the deviation (proportional element) and an integral value (integrating element) to the previous controlled variable, and then, supplies it to a PWM control unit 17 as a present controlled variable.

The PWM control unit 17 converts the controlled variable into a signal indicative of a PWM wave signal and a rotational direction of the motor M, and then, supplies the signal to a drive circuit 5. In the drive circuit 5, four FETs $Q_1$, $Q_2$, $Q_3$ and $Q_4$ is constructed so as to form a H-type bridge, and the motor M is provided on a bridging portion.

The steering angular velocity detection unit 24 detects a steering angular velocity which is a rotational speed of the steering wheel 1 on the basis of the given relative steering angle, and supplies it to the duty determination unit 25 as a steering angular velocity signal.

The aforesaid steering torque signal from the torque sensor 2 is also supplied to a dead zone detection unit 23. The dead zone detection unit 23 makes a detection whether or not the given steering torque signal exists in a dead zone of the assist control unit 12, and then, supplies the detected signal to the duty determination unit 25. In this case, the steering torque signal inputted to the dead zone detection unit 23 is a value before phase compensation is carried out. This is because the steering torque signal after phase compensation has a differentiating element; therefore, a chance for detecting a dead zone is decreased.

The duty determination unit 25 determines a duty ratio for PWM control of braking the motor M in accordance with the vehicle speed signal from the vehicle speed sensor 7, a dead zone detection signal from the dead zone detection unit 23 and the steering angular velocity signal from the steering angular velocity detection unit 24, and then, supplies the determined duty ratio to the PWM control unit 17. Braking of the motor M is carried out in order to quickly converge the steering wheel 1 at the neutral position when restoring the steering wheel 1.

The PWM control unit 17 short-circuits both terminals of the motor M in the drive circuit 5 so that a current by counter (back) electric force flows, according to PWM control on the basis of the duty ratio supplied from the duty determination unit 25 when a controlled variable supplied from the PI control unit 16 is approximately "0 (zero)" and the duty ratio supplied from the duty determination unit 25 is larger than a predetermined value.

The PWM control unit 17 does not carry out PWM control based on the duty ratio supplied from the duty determination unit 25 unless the steering angle of the restoration control unit 22 is at least within a range (e.g., −15° to +15°) of the dead zone.

Figure 4:
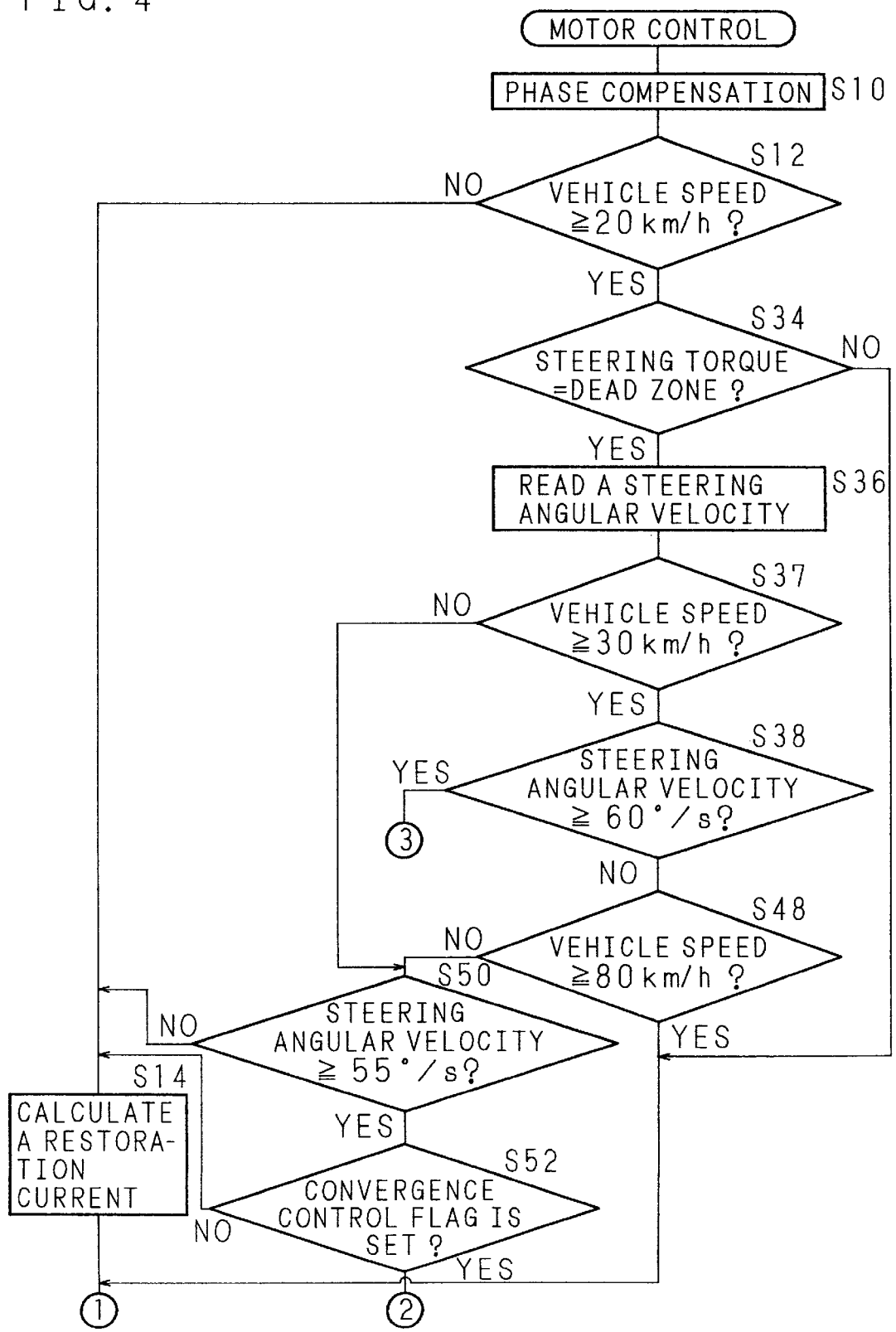
FIG. 4 is a flowchart showing control procedures of the electric power steering apparatus according to the present invention.
Figure 5:
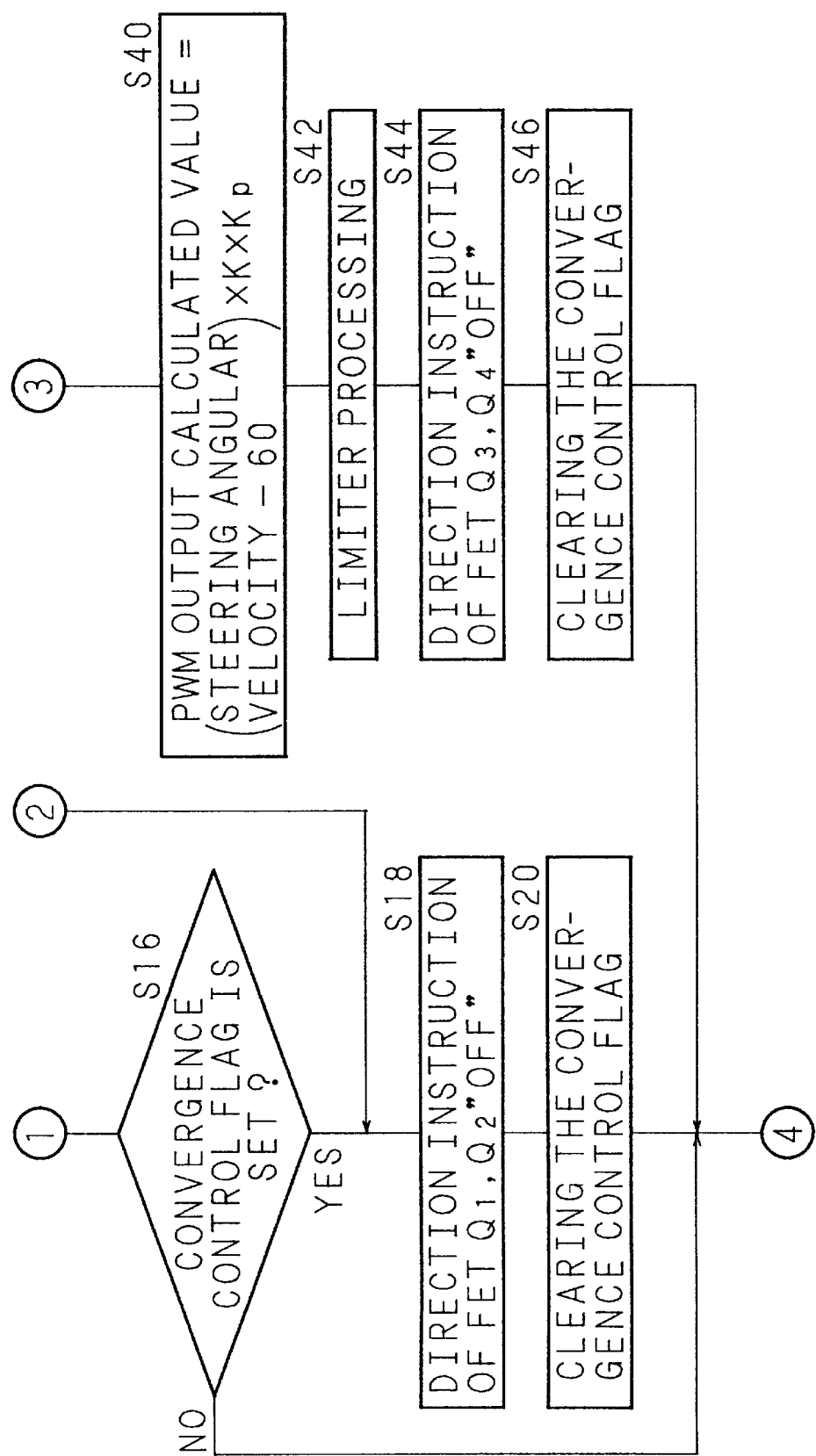
FIG. 5 is a flowchart showing control procedures of the electric power steering apparatus according to the present invention.
Figure 6:
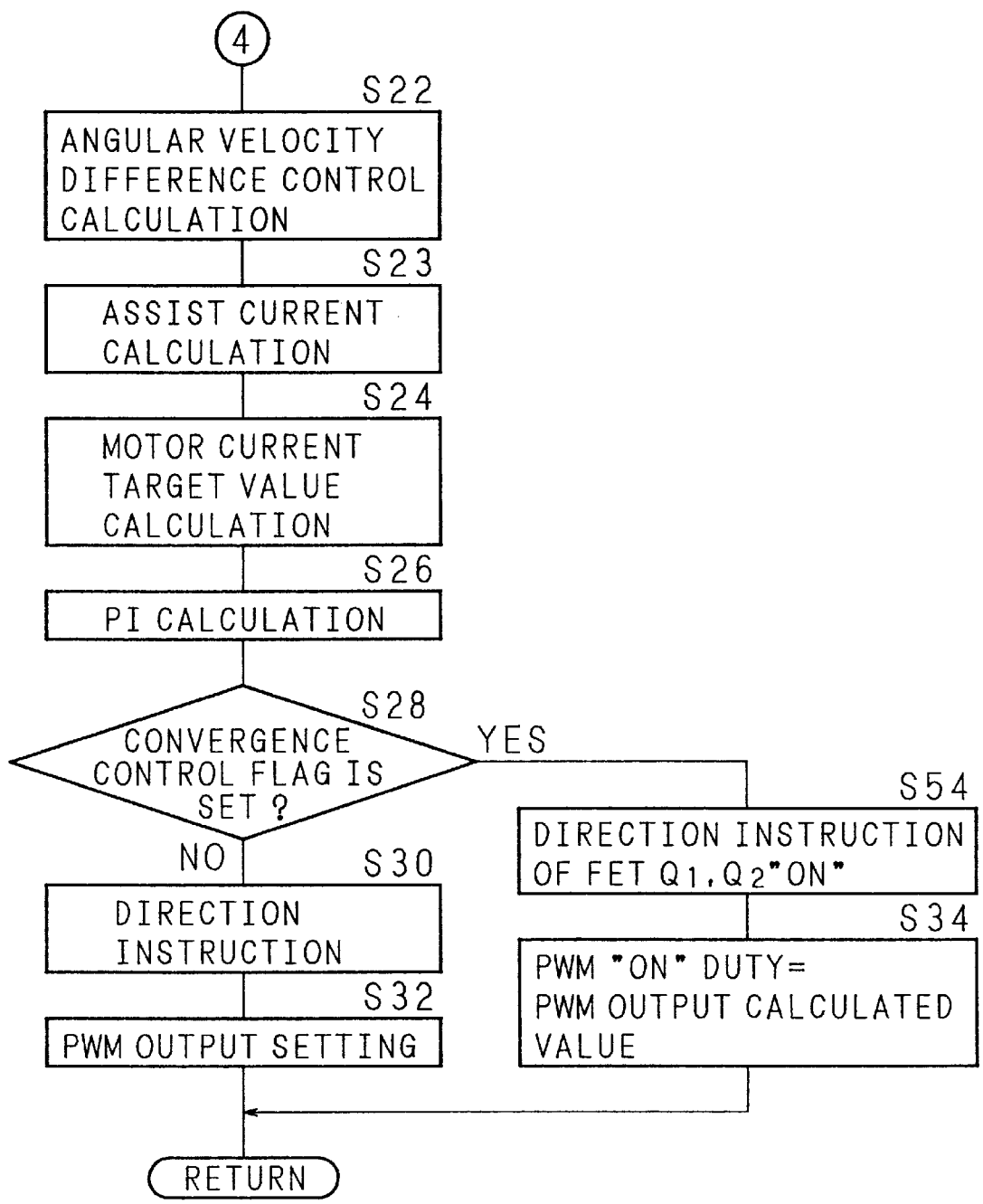
FIG. 6 is a flowchart showing control procedures of the electric power steering apparatus according to the present invention.

A braking operation of the electric power steering apparatus thus constructed will be described below with reference to the flowchart shown in FIGS. 4, 5 and 6.

First, in the phase compensation unit 11, the steering torque signal from the torque sensor 2 is compensated in its phase (step S10).

Next, in the case where the vehicle speed signal from the vehicle sensor 7 is, for example, less than 20 km/h (step S12), in order to carry out restoration control for driving the motor M to return the steering wheel 1 to the neutral position, in the restoration control unit 22, a target current value is calculated on the basis of characteristics of an absolute steering angle and a target current for restoring the steering wheel 1, and then, the target current value is supplied to the restoration current calculation unit 26.

Figure 7:
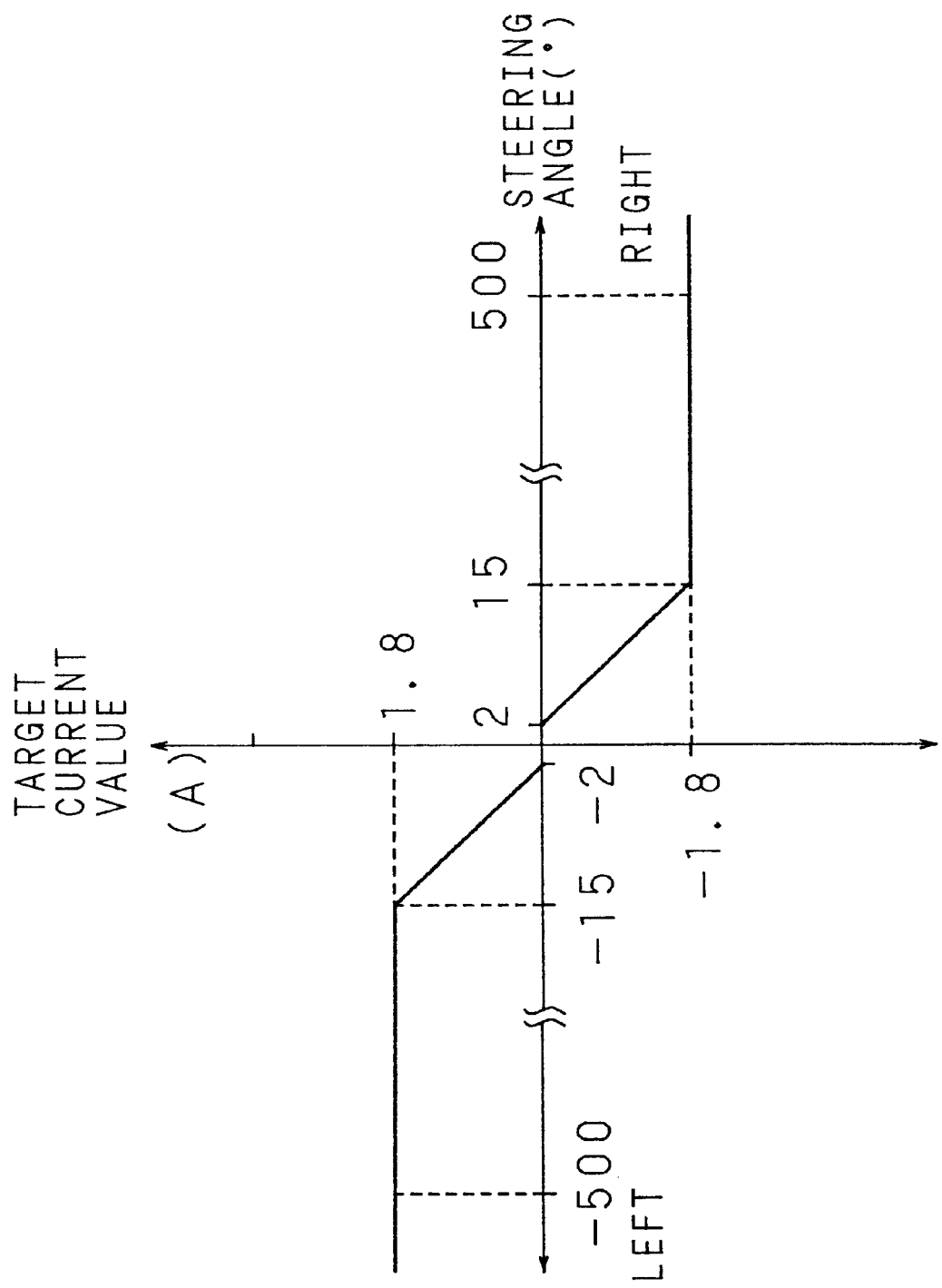
FIG. 7 is a chart showing characteristics of an absolute steering angle and a target current for restoring a steering wheel.

FIG. 7 is a chart showing characteristics of an absolute steering angle and a target current for restoring a steering wheel 1. The characteristics is as shown in FIG. 7; more specifically, when the absolute steering angles to right and left rotational direction are, for example, more than 15°, each target current for restoring the steering wheel 1 becomes a fixed ±1.8 A. When the absolute steering angles to right and left rotational direction are less than 15°, the absolute value of the target current gradually decreases from 1.8 A to 0 A in a range from −15° to −2°, and from −18 A to 0 A in a range from 15° to 2°.

The restoration current calculation unit 26 multiplies the given target current value by a vehicle speed coefficient to calculate a target current value of the restoration current (step S14).

Figure 8:
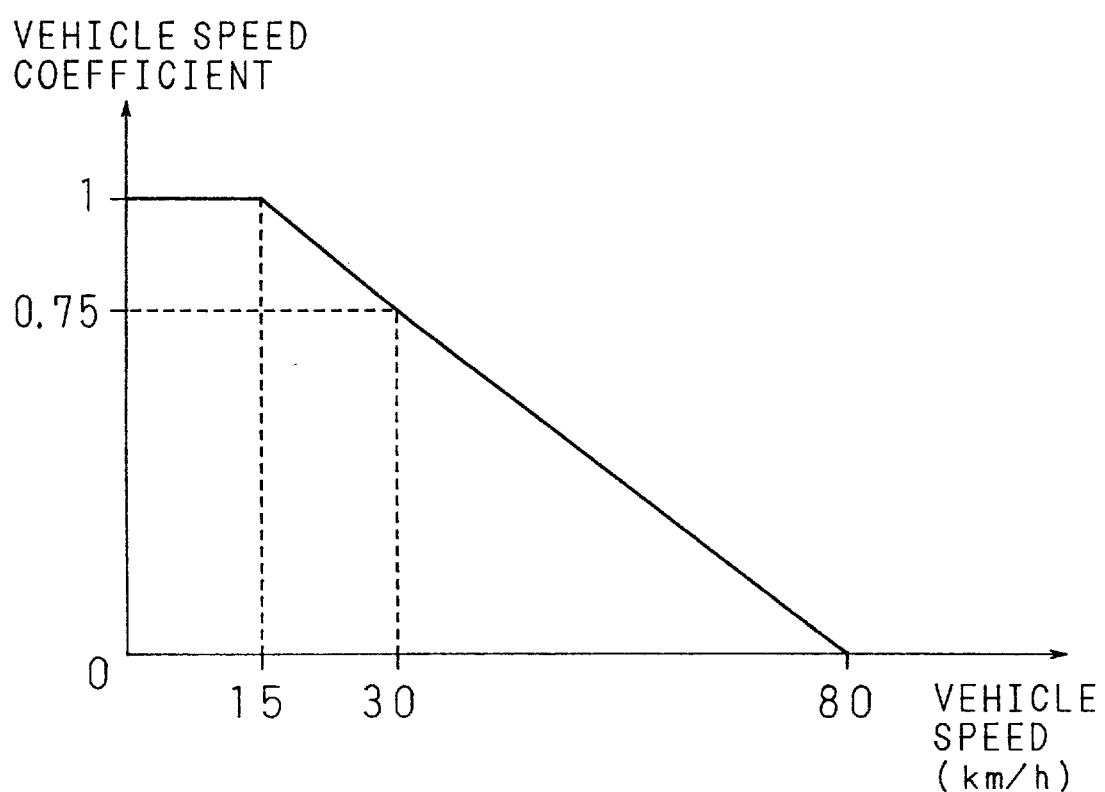
FIG. 8 is a chart to explain a vehicle speed coefficient value for calculating a target current value of a restoration current.

FIG. 8 is a chart to explain a vehicle speed coefficient value for calculating a target current value of a restoration current. As shown in FIG. 8, the vehicle speed coefficient is 1.0 while a vehicle speed is within the range of 0 km/h and 15 km/h, and gradually decreases from 1.0 to 0 while the vehicle speed is within the range of 15 km/h and 80 km/h, and further, is "0" while vehicle speed is more than 80 km/h.

A convergence control flag is previously set, and in the case where the previous control is the convergence control for quickly converging the steering wheel 1 at the neutral position when restoring the steering wheel 1 (step S16), of four FETs $Q_1$, $Q_2$, $Q_3$ and $Q_4$ constituting an H-type bridge of the drive circuit 5, FETs $Q_1$ and $Q_2$ on a high voltage P side are turned off in their direction instruction (step S18).

These FETs $Q_1$, $Q_2$, $Q_3$ and $Q_4$ are individually in an "ON" state in their direction instruction, and when a PWM signal is given to them, these FETs $Q_1$, $Q_2$, $Q_3$ and $Q_4$ are turned on according to the PWM signal. When the convergence control is carried out, FETs $Q_1$, and $Q_2$ are in an "ON" state in their direction instruction. Therefore, when the convergence control is not carried out, these FETs $Q_1$ and $Q_2$ are in an "OFF" state.

Subsequently, the convergence control flag is cleared (step S20).

When the convergence control flag is not set (step S16), turn-off of FETs $Q_1$ and $Q_2$ in their direction instruction (step S18) and clear of the convergence control flag (step S20) are not carried out.

When the vehicle speed signal from the vehicle speed sensor 7 is more than 20 km/h (step S12), if the dead zone detection unit 23 makes a detection such that the steering torque exists in the dead zone of the assist control unit 12 (step S34), in the duty determination unit 25, a steering angular velocity is read from the steering angular velocity detection unit 24 (step S36).

If the steering torque does not exist in the dead zone (step S34), a check is made whether or not the convergence control flag is set (step S16) without reading the steering angular velocity.

After read the steering angular velocity (step S36), when the vehicle speed signal from the vehicle speed sensor 7 is, for example, more than 30 km/h (step S37), a check is made whether or not the steering angular velocity read in step S36 is more than 60°/s (step S38). If the steering angular velocity read in step S36 is more than 60°/s (step S38), in order to carry out the convergence control, in the duty determination unit 25, a calculation for a PWM output calculated value= (steering angular velocity—60)×K×$K_p$ (step S40) is made to calculate a duty ratio of PWM control, and then, the duty ratio is supplied to the PWM control unit 17.

Figure 10:
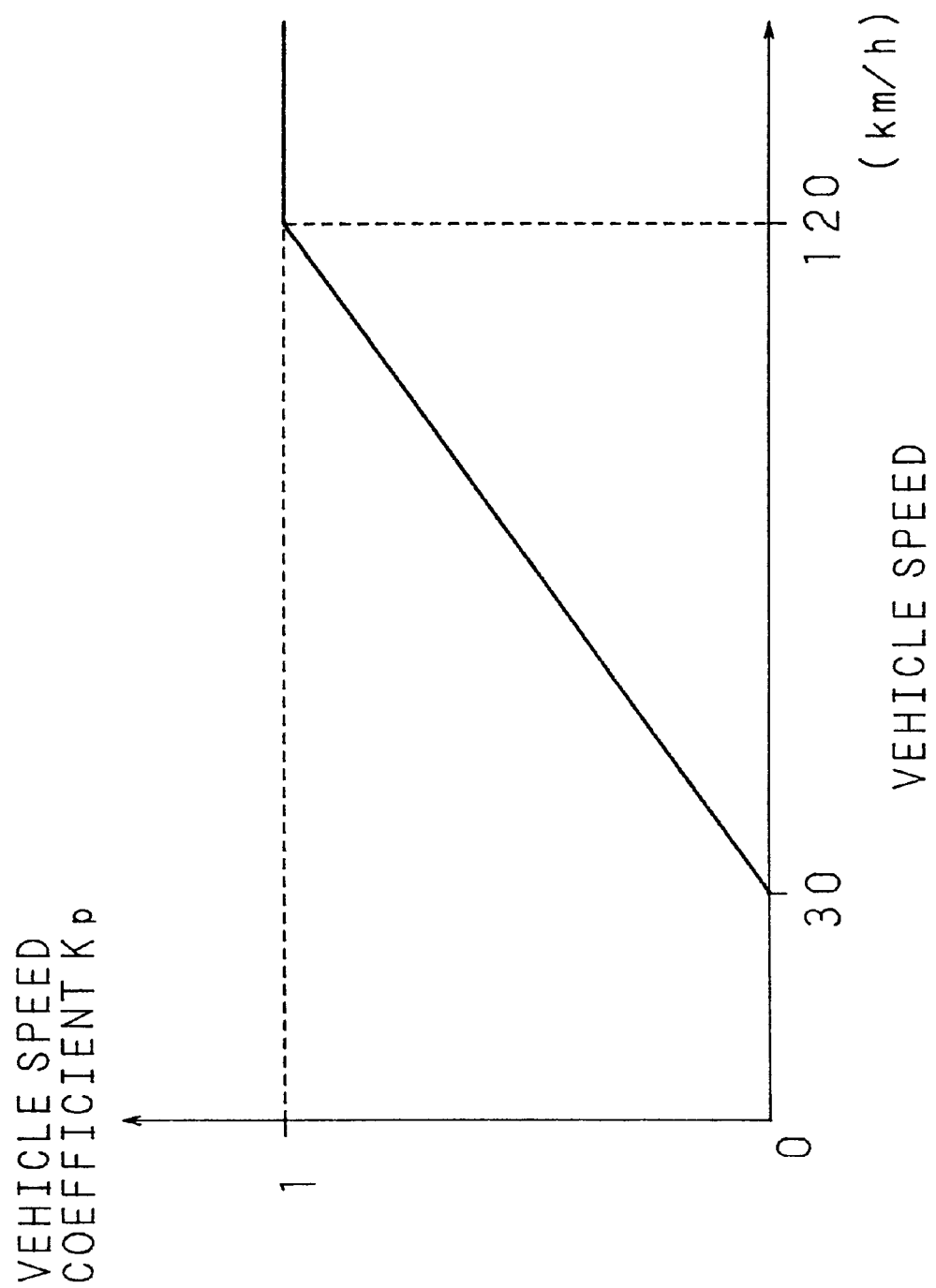
FIG. 10 is a chart to explain a vehicle speed coefficient value for calculating the duty ratio of PWM control for convergence control.

FIG. 10 is a chart to explain a vehicle speed coefficient value for calculating the duty ratio of PWM control for convergence control.

In this case, K is a control gain, and $K_p$ is, as shown in FIG. 10, a vehicle speed coefficient which gradually increases from 0 to 1.0 while the vehicle speed is within the range from 30 km/h to 120 km/h, and is 1.0 while the vehicle speed is more than 120 km/h.

Figure 9:
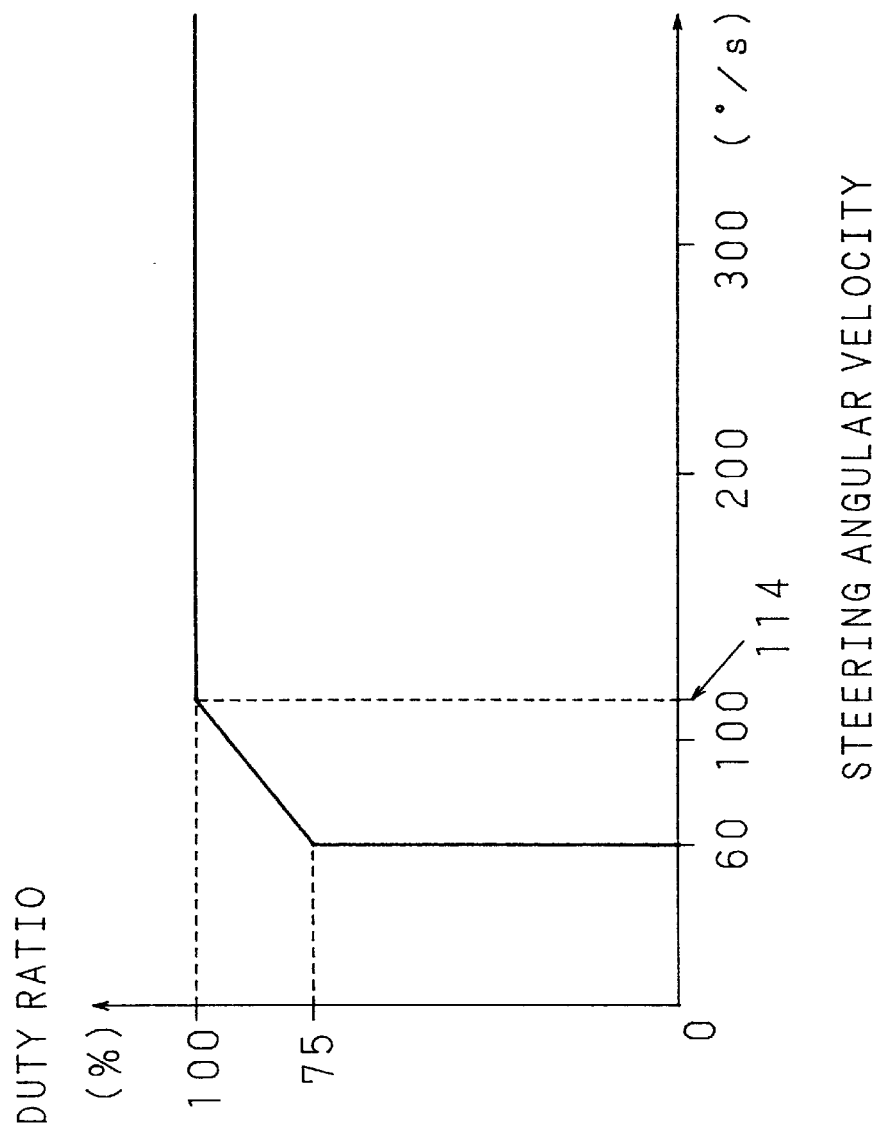
FIG. 9 is a chart to explain a duty ratio of PWM control for convergence control.

FIG. 9 is a chart to explain a duty ratio of PWM control for convergence control. As shown in FIG. 9, the PWM output calculated value (duty ratio) gradually increases from 75% to 100% while the steering angular velocity is within the range from 60°/s to 114°/s, and becomes 100% while the steering angular velocity is more than 114°/s. In this case, in order to prevent the PWM output calculated value from exceeding 100%, limiter processing is carried out (step S42).

When the duty ratio supplied from the duty determination unit 25 is larger than a predetermined value, the PWM control unit 17 makes turn off the direction instruction FETs $Q_3$ and $Q_4$ on the ground side of the drive circuit 5 (step S44) so that FETs $Q_3$ and $Q_4$ do not become "ON" state according to the PWM control. Next, the convergence control flag is set (step S46), and then, an angular velocity difference control calculation (step S22) is executed.

When the steering angular velocity read in step S36 is less than 60°/s (step S38), the duty determination unit 25 is not actuated.

When the steering angular velocity read in step S36 is less than 60°/s (step S38) and the vehicle speed is more than, for example, 80 km/h (step S48), a check is made whether the convergence control flag is set (step S16), without actuating the restoration current calculation unit 26.

When the vehicle speed signal from the vehicle speed sensor 7 is less than 30 km/h (i.e., more than 20 km/h and less than 30 km/h) (step S37) or is less than 80 km/h (step S48) and when the steering angular velocity is less than, for example, 55°/s (step S50), in the restoration current calculation unit 26, the target current value supplied from the restoration control unit 22 is multiplied by the vehicle speed coefficient to calculate a target current value of the restoration current (step S14).

If the steering angular velocity is more than 55°/s (step S50) and the convergence control flag is not set (step S52), in the restoration current calculation unit 26, the target current value supplied from the restoration control unit 22 is multiplied by the vehicle speed coefficient to calculate a target current value of the restoration current (step S14).

If the convergence control flag is set and the previous control is the convergence control (step S52), of four FETs $Q_1$, $Q_2$, $Q_3$ and $Q_4$ comprising an H-type bridge of the drive circuit 5, FETs $Q_1$ and $Q_2$ on a high voltage P side are turned off in their direction instruction (step S18).

Figure 11A:
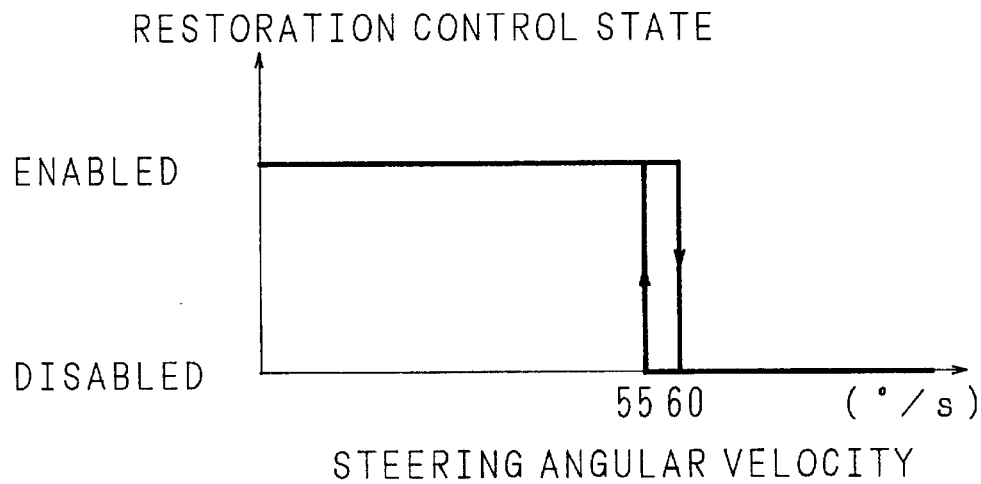
FIGS. 11A, 11B, and 11C, is a chart to explain hysteresis in the case of carrying out a change-over of restoration control and convergence control, where

FIG. 11 is a chart to explain hysteresis in the case of carrying out a change-over of restoration control and convergence control. In this case, in steps S37, S38, S48, S50 and S52, when the vehicle speed is within the range of 30 and 80 km/h, as shown in FIG. 11A, when the previous control is the restoration control (calculation for the target current value of the restoration current) and the steering angular velocity is lower than 60°/s, the restoration control is continuously possible. As shown in FIG. 11A, when the vehicle speed is within the range of 30 and 80 km/h, if the previous control is the convergence control or assist control (control in which restoration control and convergence control are not carried out) and the steering angular velocity is within the range of 55 and 60°/s, angular velocity difference control is carried out. When the steering angular velocity is lower than 55°/s, the restoration control is carried out.

Figure 11B:
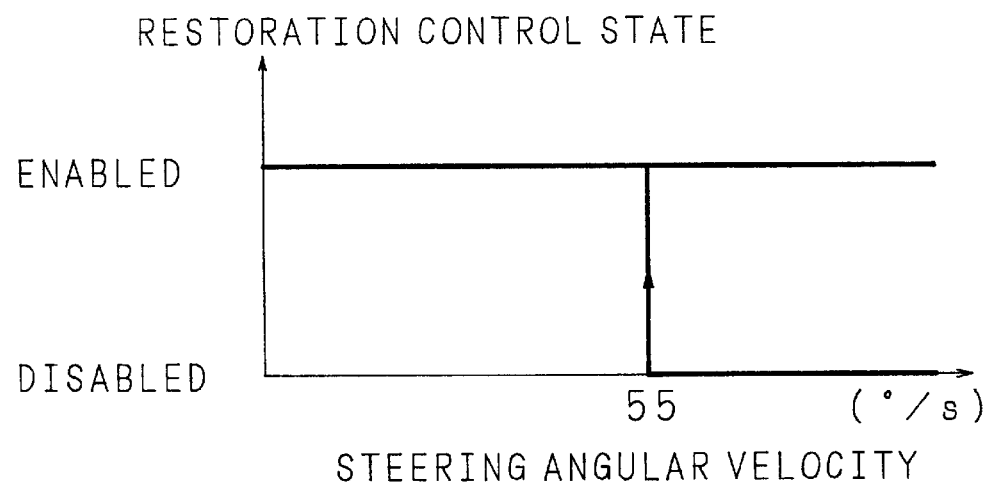

When the vehicle speed is within the range of 20 and 30 km/h, as shown in FIG. 11B, if the previous control is the restoration control and the steering angular velocity is more than 55°/s, the restoration control is continuously possible. As shown in FIG. 11B, when the vehicle speed is within the range of 20 and 30 km/h, if the previous control is the convergence control or assist control and the steering angular velocity is more than 55°/s, the angular velocity difference control is carried out. When the steering angular velocity is lower than 55°/s, the restoration control is carried out.

Figure 11C:
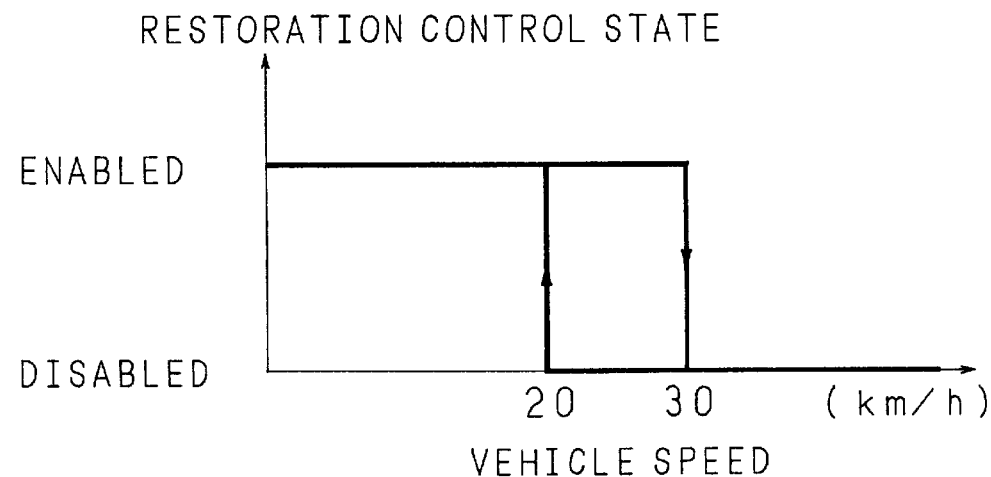

Further, when the steering angular velocity is more than 60°/s, as shown in FIG. 11C, if the previous control is the restoration control and the vehicle speed is within the range of 20 and 30 km/h, the restoration control is continuously possible. When the steering angular velocity is more than 60°/s, as shown in FIG. 11C, if the previous control is the convergence control or assist control and the vehicle speed is within the range of 20 and 30 km/h, angular velocity difference control is carried out.

Whereby it is possible to give hysteresis to the steering angular velocity and the vehicle speed when carrying out a change-over of the restoration control and the convergence control, and the restoration control and the braking control can prevent hunting from being caused.

Figure 12:
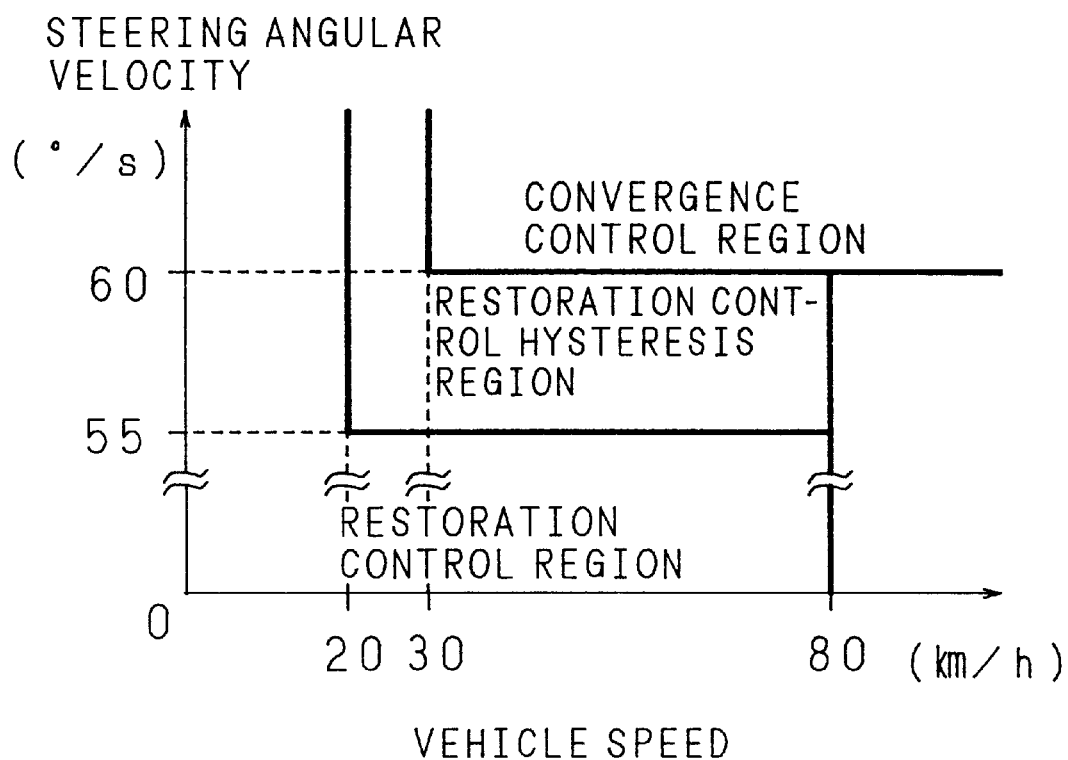
FIG. 12 is a chart to explain a relationship between a vehicle speed, a steering angular velocity, restoration control and convergence control.

FIG. 12 is a chart to explain a relationship between a vehicle speed, a steering angular velocity, restoration control and convergence control.

When the vehicle speed is within the range of 0 and 20 km/h and when the vehicle speed is within the range of 20 and 80 km/h and the steering angular velocity is lower than 55°/s, the restoration control is possible.

When the vehicle speed is higher than 30 km/h and the steering angular velocity is higher than 60°/s, the convergence control is possible.

In a region where the vehicle speed is within the range of 30 and 80 km/h and the steering angular velocity is within the range of 55 and 60°/s, and a region where the vehicle speed is within the range of 20 and 30 km/h, and the steering angular velocity is higher than 55°/s, the steering angular velocity has hysteresis when carrying out a change-over of the restoration control and the convergence control, and the restoration control or the assist control is carried out on the basis of the result whether or not the previous control is the restoration control.

Also, the angular velocity difference control calculation (step S22) and the following steps S23, S24, S26 and S28 are executed in any controls taking angular velocity difference control and continuity between the restoration control and the convergence control into consideration.

When the vehicle speed signal is less than 20 km/h (step S12), after clear of the convergence control flag (step S20) (unless the convergence control flag is set(step S16), after step S16), for inertial compensation of the motor M, the angular velocity difference control unit 4 calculates a current value in accordance with the differentiated value of the steering torque signal and the vehicle speed, and then, supplies the current value to the adding unit 14.

On the other hand, the comparison and selection unit 13 compares the target current value from the assist control unit 12 (step S23) and the target current value from the restoration current calculation unit 26 (step S14), and then, supplies the target current value having a larger absolute value to the adding unit 14.

In the adding unit 14, the target current value selected by the comparison and selection unit 13 and the calculated current value (step S22) are added together to calculate a motor current target value (step S24).

The subtracting unit 15 calculates a deviation between the motor current target value and the feedback value of the driving current of the motor M detected by the motor current detection circuit 6, and then, supplies the deviation to the PI control unit 16. The PI control unit 16 adds the deviation (proportional element) and an integral value (integrating element) of the deviation to the previous controlled variable (step S26), and supplies it to PWM control unit 17 as the present controlled variable.

Next, if the convergence control flag is not set (step S28), the PWM control unit 17 converts the controlled variable into a PWM wave signal and a signal indicative of a rotational direction of the motor M, and then, supplies them to the drive circuit 5 (steps S30 and S32).

The paired FETs $Q_1$ and $Q_4$ or the pared FETs $Q_2$ and $Q_3$, which are in an "ON" state in their direction instruction, are turned ON/OFF according to the PWM wave signal, and thereby, the motor M is rotated according to the direction instruction, and the assist control or the restoration control is carried out.

If the convergence control flag is set (step S28), the direction instruction of FETs $Q_1$, and $Q_2$ on high voltage P side of the drive circuit 5 is turned on (step S54), and then, the PWM wave signal based on the duty ratio (step S40) supplied from the duty determination unit 25 is supplied to the drive circuit 5 (step S34).

The paired FETs $Q_1$, and $Q_2$, which are in an "ON" state in their direction instruction, are turned ON/OFF according to the PWM wave signal. Whereby a circuit through which a current by a counter electric force generated by the inertial rotation of the motor M flows is formed according to the PWM control (both terminals of the motor M are short-circuited), and thus, the rotation of the motor M can be restricted by a braking force generated by the current (convergence control).

Figure 13:
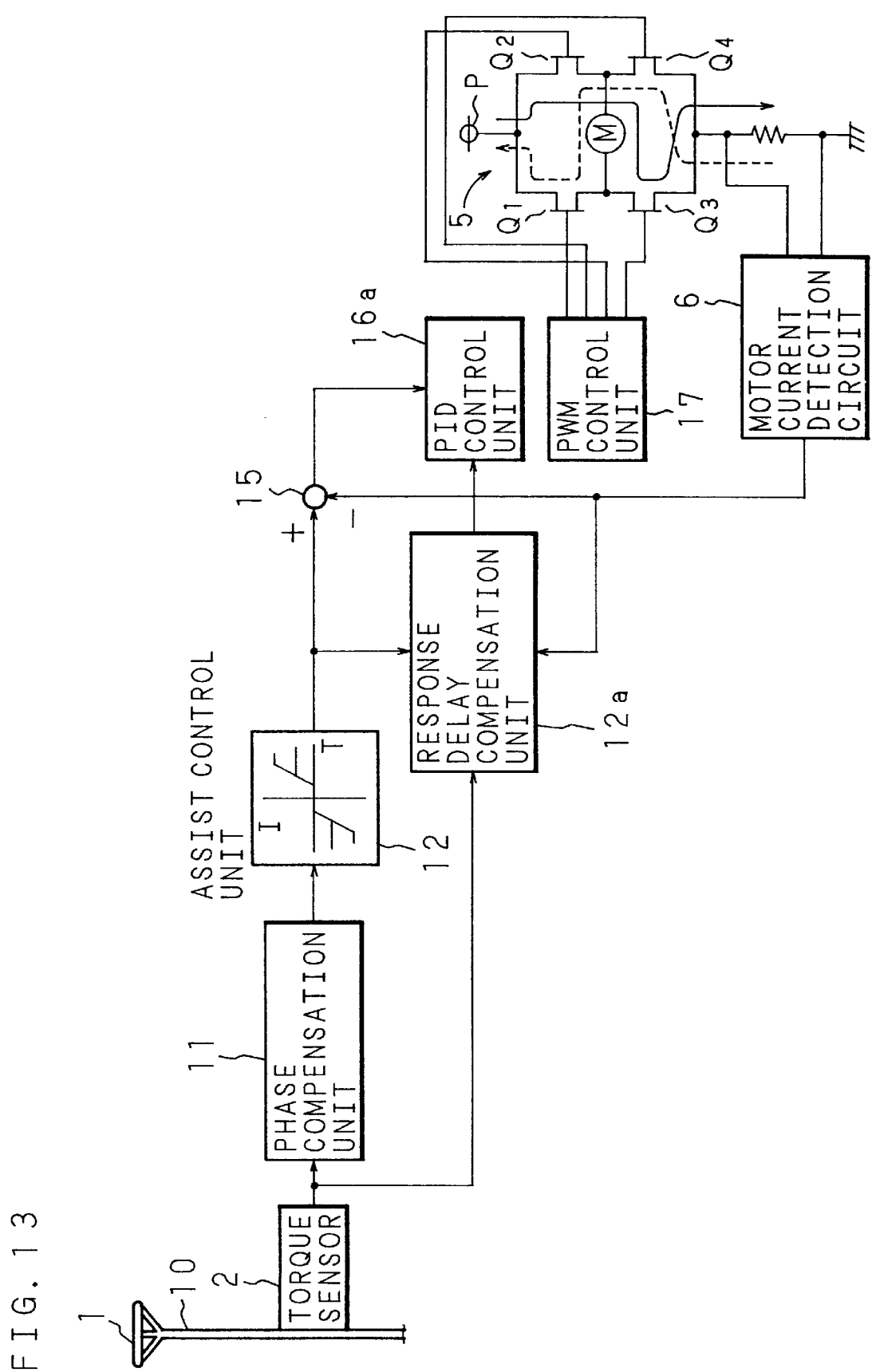
FIG. 13 a block diagram showing a principal configuration of the disclosed electric power steering apparatus.

FIG. 13 is a block diagram showing principal configuration of the disclosed electric power steering apparatus. In the electric power steering apparatus, the steering torque signal from the torque sensor 2 provided on the steering shaft 10 is compensated in its phase by means of the phase compensation unit 11, and then, is supplied to the assist control unit 12.

The assist control unit 12 supplies a target current value of the motor M for assist control (steering assisting control) based on the steering torque signal from the phase compensation unit 11 to the subtracting unit 15 and a response delay compensation unit 12a.

The response delay compensation unit 12a is supplied with the target current value from the assist control unit 12, the steering torque signal from the torque sensor 2 and a detected current value of the driving current of the motor M detected by the motor current detection circuit 6. When the target current value and the detected current value are both "0", the response delay compensation unit 12a supplies an offset in response to a variation of the steering torque to a PID control unit 16a as the previous target voltage value.

The subtracting unit 15 calculates a deviation between the motor current target value and a feedback value of the driving current of the motor M detected by the motor current detection circuit 6, and then, supplies the deviation to the PID control unit 16a. The PID control unit 16a adds the deviation (proportional element), an integral value (integrating element) of the deviation and a differentiating value (differentiating element) to the previous target voltage value, and then, supplies the added value to the PWM control unit 17 as the present target voltage value.

The PWM control unit 17 converts the present target voltage value into a PWM signal and a signal indicative of a rotational direction of the motor M, and then, supplies these signals to the drive circuit 5. The drive circuit 5 is constructed in a manner that four FET $Q_1$, $Q_2$, $Q_3$ and $Q_4$ are formed into an H-type bridge, and the steering force assisting motor M is provided on a bridging portion.

Control procedures of the electric power steering apparatus thus constructed will be described below with reference to a flowchart shown in FIG. 14.

Figure 14:
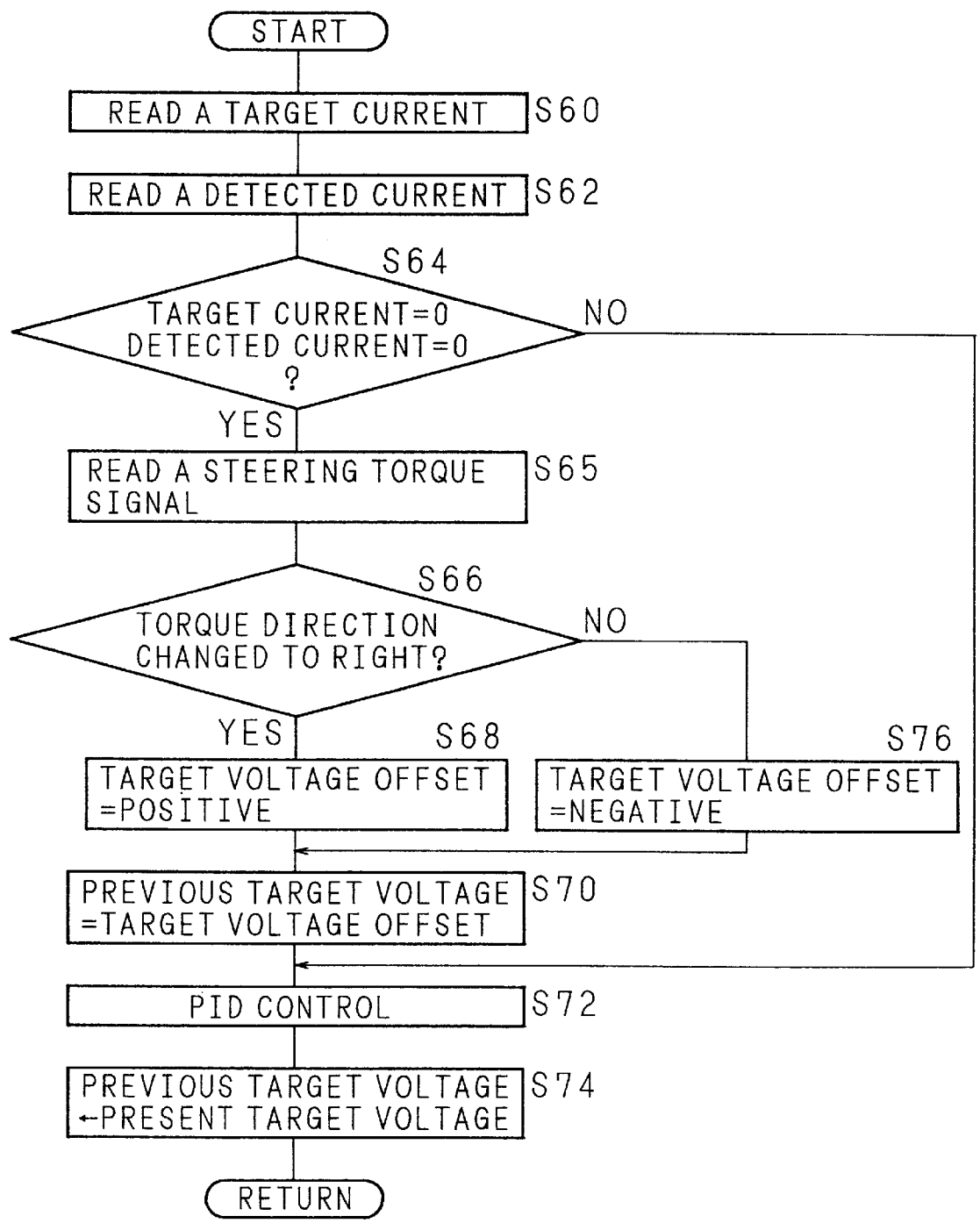
FIG. 14 is a flowchart showing control procedures of the disclosed electric power steering apparatus.

FIG. 14 is a flowchart showing control procedures of the disclosed electric power steering apparatus. The response delay compensation unit 12a first reads the target current value from the assist control unit 12 (step S60), and subsequently reads a detected current value from the motor current detection circuit 6 (step S62).

Next, the response delay compensation unit 12a makes a check whether or not the target current value and the detected current value are both "0" (step S64). If the target current value and the detected current value are both "0", the response delay compensation unit 12a reads a steering torque signal from the torque sensor 2 (step S65).

Subsequently, the response delay compensation unit 12a makes a check of a change direction of the steering torque indicated by the steering torque signal (step S66). If the change direction is right, positive target voltage offset is set (step S68), and then, the positive target voltage offset is supplied to the PID control unit 16a as the previous target voltage (step S70).

If the change direction is left, negative target voltage offset is set (step S76), and then, the negative target voltage offset is supplied to the PID control unit 16a as the previous target voltage (step S70).

The PID control unit 16a adds the deviation (proportional element) supplied from the subtracting unit 15, an integral value (integrating element) of the deviation and a differentiating value (differentiating element) to the previous target voltage value, and then, supplies the added value to the PWM control unit 17 as the present target voltage value (step S72), and thereafter, returns the present target voltage value as the previous target voltage value (step S74).

The PWM control unit 17 converts the present target voltage value into a PWM wave signal and a signal indicative of a rotational direction of the motor M, and then, supplies these signals to the drive circuit 5. The drive circuit 5 turns ON/OFF the paired FETs $Q_1$ and $Q_4$ or the paired FETs $Q_2$ and $Q_3$ on the basis of the PWM wave signal and the signal indicative of a rotational direction of the motor M, and thus, the motor M is driven in its rotation.

The response delay compensation unit 12*a* makes a check whether or not the target current value and the detected current value are both "0" (step S64), and does not actuate when either desired current value or detection current value is not "0".

Figure 15:
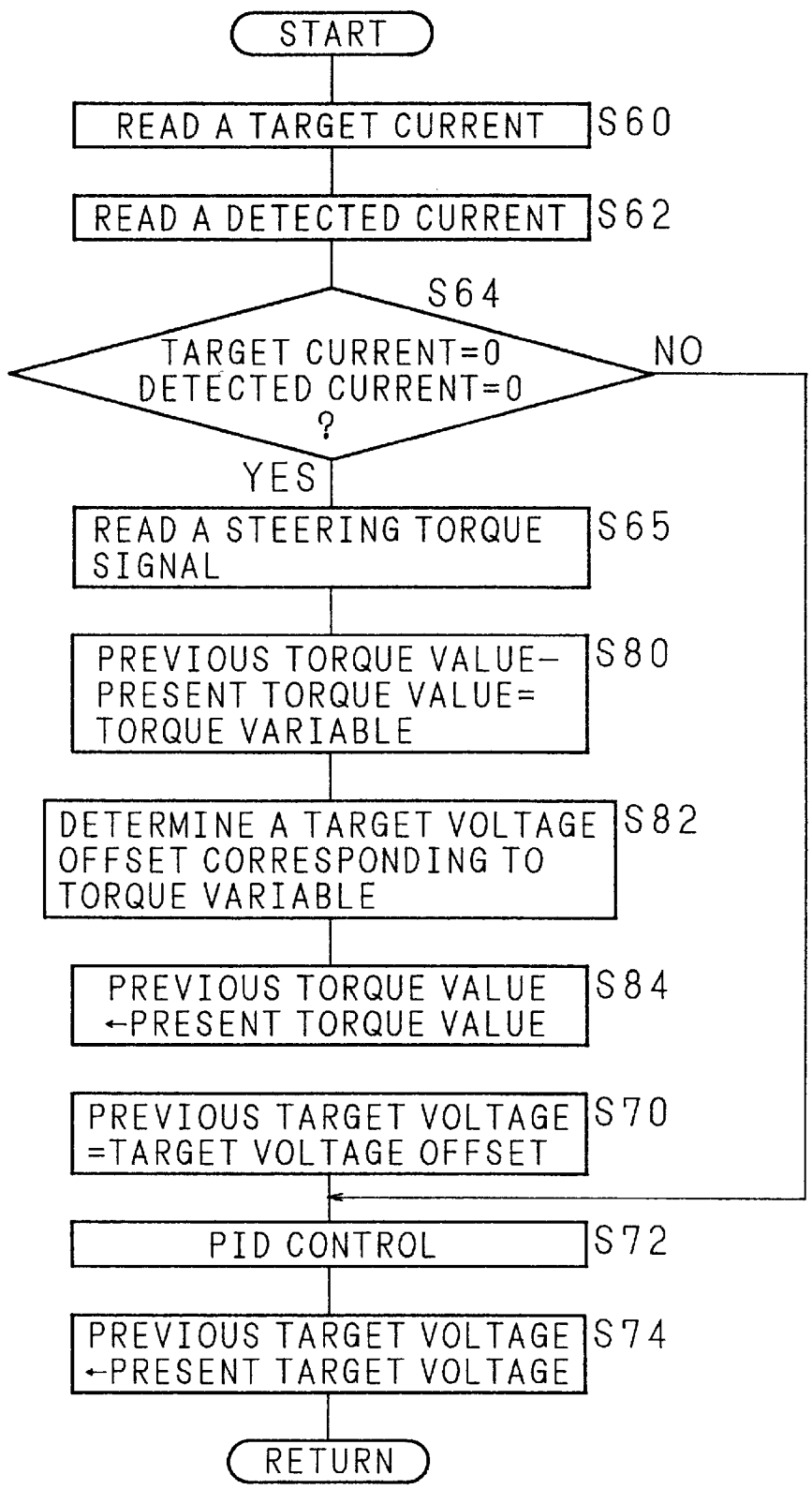
FIG. 15 is a flowchart showing control procedures of the disclosed electric power steering apparatus.

FIG. 15 is a flowchart showing control procedures of the disclosed another electric power steering apparatus. The electric power steering apparatus is constructed in a manner that the response delay compensation unit 12*a* of FIG. 13 has a target voltage offset value table in response to a steering torque variable indicated by the steering torque signal from the torque sensor 2. Other construction is the same as the aforesaid block diagram shown in FIG. 13; therefore, the details are omitted.

In the flowchart of FIG. 15, the response delay compensation unit 12*a* of the electric power steering apparatus reads a steering torque signal from the torque sensor 2 (step S65).

Next, the response delay compensation unit 12*a* calculates a difference between the previous torque value and the present torque value indicated by the steering torque signal as a torque variable (step S80). Subsequently, the response delay compensation unit 12*a* calculates a target voltage offset value corresponding to the calculated torque variable from the target voltage offset value table, and then, sets it as a target voltage offset (step S82).

Further, the response delay compensation unit 12*a* sets the present torque value as the previous torque value (step S84). Other procedures are the same as the aforesaid flowchart of FIG. 14; therefore, the details are omitted.

As described above, conventionally, when making a change-over of the driving direction of the steering force assisting motor M, if the target current value and the detected current value are both "0", a target voltage is set to "0" in current feedback control. For this reason, motor inertial compensation control is not sufficiently performed due to a response delay of calculation in fine steering region in the vicinity of a steering torque "0". However, in these disclosed electric power steering apparatus, it is possible to solve the above problem, so that response performance of steering control can be improved, and also, preferable steering feeling can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for a vehicle including a steering wheel, comprising:

a motor for steering force assistance;

a steering torque detector detecting a steering torque applied to said steering wheel;

a target value generator producing a target value of said motor current on the basis of the value of said steering torque detected by the steering torque detector;

a motor driver driving said motor utilizing PWM control so that the current of said motor becomes the target value;

a steering angular velocity detector detecting steering angular velocity;

a vehicle speed sensor;

a braking controller braking said motor when the detected value of said steering torque is within a predetermined range, the vehicle speed detected by said vehicle speed sensor is higher than a first vehicle speed, and the steering angular velocity detected by said steering angular velocity detector is higher than a first steering angular velocity;

a driving controller, driving said motor and restoring said steering wheel to a steering angle predetermined point when the vehicle speed is lower than the first vehicle speed, and when the vehicle speed is between the first vehicle speed and a second vehicle speed which is higher than the first vehicle speed and the steering angular velocity is lower than the first steering angular velocity;

a steering return controller controlling restoring of said steering wheel to the steering angle predetermined point when the vehicle speed is lower than a third vehicle speed which is lower than the first vehicle speed, and when the vehicle speed is between the third vehicle speed and the first vehicle speed while carrying out steering return control; and a steering return control inhibitor disabling steering return control when the vehicle speed is higher than the first vehicle speed, the steering angular velocity is higher than the first steering angular velocity, and the vehicle speed is between the first vehicle speed and the third vehicle speed while inhibiting the steering return control.

2. The electric power steering apparatus according to claim 1, further comprising:

a further controller controlling restoring of said steering wheel to the steering angle predetermined point when the steering angular velocity is lower than a second steering angular velocity which is lower than the first steering angular velocity and falls between the second angular velocity and the first steering angular velocity while carrying out the steering return control; and a further inhibitor disabling steering return control when the steering angular velocity is higher than the first steering angular velocity and is between the first steering angular velocity and the second steering angular velocity while inhibiting the steering return control.

3. An electric power steering apparatus for a vehicle including a steering wheel, comprising:

a motor for steering force assistance;

a steering torque detector detecting a steering torque applied to said steering wheel;

a target value generator producing a target value of said motor current on the basis of the value of said steering torque detected by the steering torque detector;

a motor driver driving said motor utilizing PWM control so that the current of said motor becomes the target value;

a steering angular velocity detector detecting steering angular velocity;

a vehicle speed sensor;

a braking controller controlling braking of said motor when the detected value of said steering torque detector is within a predetermined range, the vehicle speed detected by said vehicle speed sensor is higher than a first vehicle speed, and the steering angular velocity detected by said steering angular velocity detector is higher than a first steering angular velocity;

a restoring controller controlling driving of said motor and restoring of said steering wheel to a steering angle predetermined point when the vehicle speed is lower than a third vehicle speed which is lower than the first vehicle speed, and when the vehicle speed is between the third vehicle speed and a second vehicle speed which is higher than the first vehicle speed and the steering angular velocity is lower than a second steering angular velocity which is lower than the first steering angular velocity;

a restoring control inhibitor, disabling control of restoring said steering wheel to the steering angle predetermined point when the vehicle speed is between the third vehicle speed and the first vehicle speed and the steering angular velocity is higher than the second steering angular velocity, and when the vehicle speed is between the first vehicle speed and the second vehicle speed and the steering angular velocity is between the second steering angular velocity and the first steering angular velocity, while said braking controller controls braking of said motor; and a further controller continuously controlling restoring of said steering wheel to the steering angle predetermined point when the vehicle speed is between the third vehicle speed and the first vehicle speed and the steering angular velocity is higher than the second steering angular velocity, and when the vehicle speed is between the first vehicle speed and the second vehicle speed and the steering angular velocity is between the second steering angular velocity and the first steering angular velocity, while said restoring controller carries out the steering return control.

4. An electric power steering apparatus for a vehicle including a steering wheel, comprising:

a motor for steering force assistance;

a steering torque detector detecting a steering torque applied to said steering wheel;

a target value generator producing a target value of said motor current on the basis of the value of said steering torque detected by the steering torque detector;

a motor driver driving said motor utilizing PWM control so that the current of said motor becomes the target value;

a steering angular velocity detector detecting steering angular velocity;

a vehicle speed sensor;

a braking controller controlling braking of said motor in a first vehicle-speed/steering-angular-velocity region when the detected value of said steering torque detector is within a predetermined range, the vehicle speed detected by said vehicle speed sensor is higher than a first vehicle speed, and the steering angular velocity detected by said steering angular velocity detector is higher than a first steering angular velocity;

a restoring controller controlling driving of said motor and restoring of said steering wheel to a steering angle predetermined point in a second vehicle-speed/steering-angular-velocity region where the vehicle speed is lower than a third vehicle speed which is lower than the first vehicle speed, and where the vehicle speed is between the third vehicle speed and a second vehicle speed which is higher than the first vehicle speed and the steering angular velocity is lower than a second steering angular velocity which is lower than the first steering angular velocity;

an inhibitor disabling restoring control in a state wherein said braking controller controls braking of said motor when the relationship between the vehicle speed and the steering angular velocity shifts from the first vehicle-speed/steering-angular-velocity region to a third vehicle-speed/steering-angular-velocity region where the vehicle speed is between the third vehicle speed and the first vehicle speed and the steering angular velocity is higher than the second steering angular velocity, and where the vehicle speed is between the first vehicle speed and the second vehicle speed and the steering angular velocity is between the second steering angular velocity and the first steering angular velocity; and a further controller controlling restoring of said steering wheel to the steering angle predetermined point when the relationship shifts to the third vehicle-speed/steering-angular-velocity region from a state wherein said restoring controller carries out the control.

* * * * *